United States Patent
Wernimont

(10) Patent No.: US 11,215,256 B2
(45) Date of Patent: Jan. 4, 2022

(54) MULTI-STAGE SHOCK ABSORBER AND METHOD FOR USING THE SAME

(71) Applicant: Russ Wernimont, Murrieta, CA (US)

(72) Inventor: Russ Wernimont, Murrieta, CA (US)

( * ) Notice: Subject to any disclaimer, the term of this patent is extended or adjusted under 35 U.S.C. 154(b) by 200 days.

(21) Appl. No.: 16/410,197

(22) Filed: May 13, 2019

(65) Prior Publication Data

US 2019/0346006 A1 Nov. 14, 2019

Related U.S. Application Data

(60) Provisional application No. 62/671,021, filed on May 14, 2018.

(51) Int. Cl.

| | |
|---|---|
| *F16F 9/06* | (2006.01) |
| *F16F 9/58* | (2006.01) |
| *F16F 9/50* | (2006.01) |
| *F16F 9/48* | (2006.01) |
| *F16F 9/512* | (2006.01) |

(52) U.S. Cl.
CPC .............. *F16F 9/065* (2013.01); *F16F 9/061* (2013.01); *F16F 9/067* (2013.01); *F16F 9/486* (2013.01); *F16F 9/50* (2013.01); *F16F 9/585* (2013.01); *F16F 9/512* (2013.01); *F16F 2222/12* (2013.01); *F16F 2228/066* (2013.01)

(58) Field of Classification Search
CPC .... F16F 9/26; F16F 9/165; F16F 9/064; F16F 9/182; F16F 9/48
USPC ...................................................... 267/64.26
See application file for complete search history.

(56) References Cited

U.S. PATENT DOCUMENTS

| | | | | |
|---|---|---|---|---|
| 2,696,278 A | * | 12/1954 | Bonn ......................... | F16F 9/48 188/317 |
| 2,870,744 A | * | 1/1959 | Hallerstrom .............. | F16F 9/48 91/395 |
| 3,171,643 A | * | 3/1965 | Roos ....................... | F16F 9/585 267/64.15 |
| 3,299,996 A | * | 1/1967 | De Coye De Castelet ................. | F16F 9/48 188/282.9 |
| 3,363,894 A | * | 1/1968 | Hill .......................... | F16F 9/06 267/64.15 |
| 4,635,766 A | * | 1/1987 | Street, Jr. ................ | B60G 13/08 188/284 |
| 4,854,554 A | * | 8/1989 | Ludwig .................. | E05F 1/1292 267/64.11 |

(Continued)

*Primary Examiner* — Bradley T King
(74) *Attorney, Agent, or Firm* — Marcus C. Dawes

(57) ABSTRACT

A shock absorber having a plurality of pistons in a telescopic or nested configuration. The shock absorber has a first shaft with a first piston disposed within a cylinder filled with a hydraulic fluid. A second shaft is in turn disposed within the first shaft, the second shaft having a second piston extending beyond the position of the first piston. The second shaft is further coupled to a vehicle's suspension system. When undergoing a displacement, the second piston moves through the cylinder and compresses an external spring. After the second shaft has been fully extended, the first piston is then actuated, thereby also moving through the hydraulic fluid. As the pistons traverse through the cylinder, a volume of the fluid is pushed into a reservoir communicated to the cylinder. Both the first and second shafts are configured to move independently with respect to each other and to the cylinder.

11 Claims, 5 Drawing Sheets

(56) References Cited

U.S. PATENT DOCUMENTS

| | | | | |
|---|---|---|---|---|
| 5,529,519 | A * | 6/1996 | Nakamura | B63H 21/265 |
| | | | | 440/61 D |
| 5,692,429 | A * | 12/1997 | Sonntag | F15B 15/22 |
| | | | | 91/395 |
| 6,619,445 | B2 * | 9/2003 | Forster | F16F 9/062 |
| | | | | 188/297 |
| 9,784,332 | B2 * | 10/2017 | Bandy | F16F 9/067 |
| 2006/0021833 | A1 * | 2/2006 | Runkel | F16F 9/096 |
| | | | | 188/314 |
| 2007/0087876 | A1 * | 4/2007 | Ward | F16F 9/48 |
| | | | | 474/110 |
| 2011/0101579 | A1 * | 5/2011 | Polakowski | F16F 9/3228 |
| | | | | 267/64.26 |
| 2016/0002012 | A1 * | 1/2016 | Cannell | B66C 13/02 |
| | | | | 188/269 |
| 2020/0271185 | A1 * | 8/2020 | Newhan | F16F 9/084 |

* cited by examiner

MULTI-STAGE SHOCK ABSORBER AND METHOD FOR USING THE SAME

RELATED APPLICATIONS

The present application is a non-provisional of U.S. application Ser. No. 62/671,021, filed on May 14, 2018, which is incorporated herein by reference and to which priority is claimed pursuant to 35 USC 120.

BACKGROUND

Field of the Technology

The invention relates to the field of shock absorbers, particularly shock absorbers with variable dampening.

Description of the Prior Art

Shock absorbers or other types of dampening devices have long been used to dampen or lessen the shock experienced by everything from bicycles, to landing gear for aircraft, to off-road vehicles. Typically, a shock absorber can consist of a relatively stiff spring with a large spring constant, or a hydraulic device containing a fluid which converts mechanical movement of the incoming displacement of the shock absorber into heat which is then dissipated into the surrounding environment, or both. Specifically, many hydraulic dampening devices comprise a cylinder or can containing a piston coupled to a shaft which is immersed in a hydraulic fluid. When the vehicle or other object on which the cylinder is disposed undergoes a shock, the shaft reacts by moving in the same direction as the displacement of the vehicle's suspension. Movement of the shaft in turn moves the piston through the hydraulic fluid, thereby causing friction between it and the hydraulic fluid within the defined volume of the cylinder. As the shaft moves through the fluid, the coefficient of friction becomes greater, resulting in an increasing "stiff" cushion which slows the movement of the piston and thereby dampens the force of the vehicle's movement. At the same time the piston is moving through the fluid, an external spring coupled between an external portion of the shaft and the cylinder is compressed, further dampening the incoming force or shock of the vehicle's suspension system. After the initial shock, the upward force placed on the shaft and piston is relaxed, thereby allowing the compressed external spring to expand and push the piston and shaft back into the opposing direction until an equilibrium is once again obtained.

A problem arises however when an exceptionally strong or forceful shock is experienced by the dampening device. When undergoing a strong shock, the piston will move through the hydraulic fluid beyond its maximum allowance and strike the top of the cylinder. Those experiencing this "bottoming out" feel an exceptionally rough ride which can be uncomfortable as well as potentially damage the cylinder or the overall vehicle itself. Additionally, when the piston moves through too quickly or beyond its maximum functional range, a large amount of pressure and heat is created within the cylinder which can lead to further malfunctions or other mechanical failures.

Several attempts have been made to prevent unnecessary bottoming out by dampening devices. One prior solution includes coupling multiple pistons to the shaft disposed within the cylinder, thereby changing the fluid dynamics within the cylinder as the pistons move through the hydraulic fluid. In another particular example, the cylinder is configured to accommodate a first piston in a first defined volume and a second piston in a second volume which is substantially different than the first volume. A significant drawback to this however is that having multiple pistons disposed at fixed positions along a shaft requires a longer than average cylinder, thus requiring a large suspension system overall. This can be a problem for many vehicles which can only accommodate a certain range of lengths of shock absorbers, thus restricting the use of such a design.

What is needed therefore is a shock absorber or dampening device which is capable of absorbing large forces without exceeding its functional limits while also not increasing the overall length of the dampening device.

BRIEF SUMMARY

The current invention solves this and other problems by providing an apparatus for dampening the movement of a vehicle. The dampening apparatus includes a cylinder with a first shaft and a second shaft disposed therein. Specifically, the second shaft is nested or telescopically disposed within the first shaft so that the first shaft and second shaft may move through a length of the cylinder both independently of each other and to the cylinder.

In one embodiment, the first shaft has a first piston disposed on a proximal end of the first shaft while the second shaft has a second piston disposed on its corresponding proximal end. Here, the first piston includes an aperture which accommodates the second shaft there through. In a related embodiment, the first piston and the second piston each have a plurality of apertures defined through their respective surfaces.

In a related embodiment, the first shaft has a bore defined through its longitudinal length so that the second shaft can nested or telescopically disposed therein.

In another embodiment, the dampening apparatus also includes a volume of air and an internal volume of fluid disposed within the cylinder. In this embodiment, a piston is disposed between the volume of air and the internal volume of fluid within the cylinder. A valve may further be communicated to the volume of air in order to regulate the pressure of the volume of air. Additionally, the volume of air and the piston disposed between the volume of air and the internal volume of fluid within the cylinder are disposed within a reservoir that is connected to the cylinder. In one particular variation, the reservoir is connected to a longitudinal position of the cylinder which is below a maximum extension position of the second shaft relative to a proximal end of the cylinder.

In another embodiment, the dampening apparatus also incudes a stop that is disposed within the cylinder. The stop has a bore which is configured to accommodate movement of both the first shaft and the second shaft there through.

In yet another embodiment, the dampening apparatus has a needle which is connected to a proximate portion of the cylinder. The second shaft in turn has an aperture which is sized and shaped to accommodate the needle when the second shaft has moved through the proximate portion of the cylinder.

The invention further provides a method for dampening a displacement force. The method includes disposing a first shaft within a cylinder filled with a fluid and then disposing a second shaft within the first piston shaft. The second shaft is then moved through the fluid relative to both the first shaft and to the cylinder in response to the displacement force, while the first shaft is simultaneously moved through the fluid relative to both the second shaft and to the cylinder in response to the same displacement force.

In one embodiment, moving the second shaft through the fluid relative to the first shaft specifically involves pushing the first shaft through the fluid by the second shaft.

In another embodiment, the method also includes compressing a volume of air with a piston that is in contact with the fluid which is in response to the movement of either the first shaft or the second shaft through the fluid. The volume of air may further be regulated by manipulating a valve communicated to the volume of air. Compressing the volume of air with the piston may specifically include compressing the volume of air within a reservoir that is fluidicly communicated to the cylinder. Additionally, in a related embodiment, a portion of the fluid from the cylinder is transferred to the reservoir by the movement of the first shaft and/or the second shaft. Relatedly, compressing the volume of air within the reservoir may be specifically accomplished by pressing the piston against the volume of air by the portion of fluid which is transferred from the cylinder.

In yet another embodiment, moving the second shaft through the fluid relative to both the first shaft and to the cylinder in response to the displacement force specifically includes inserting a needle coupled to the cylinder into a bore which is defined in the second shaft.

In a further embodiment, the method step of moving both the second shaft and the first shaft through the fluid relative to the cylinder in response to the displacement force includes moving a second piston that is disposed on the second shaft and moving a first piston that is disposed on the first shaft through the fluid contained within the cylinder. More specifically, moving the second piston disposed the second shaft and moving the first piston disposed on the first shaft through the fluid within the cylinder includes channeling the fluid through a plurality of holes defined within the first piston and the second piston, respectively.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The disclosure can be better visualized by turning now to the following drawings wherein like elements are referenced by like numerals.

The disclosure and its various embodiments can now be better understood by turning to the following detailed description of the preferred embodiments which are presented as illustrated examples of the embodiments defined in the claims. It is expressly understood that the embodiments as defined by the claims may be broader than the illustrated embodiments described below.

DETAILED DESCRIPTION OF THE PREFERRED EMBODIMENTS

Figure 1:
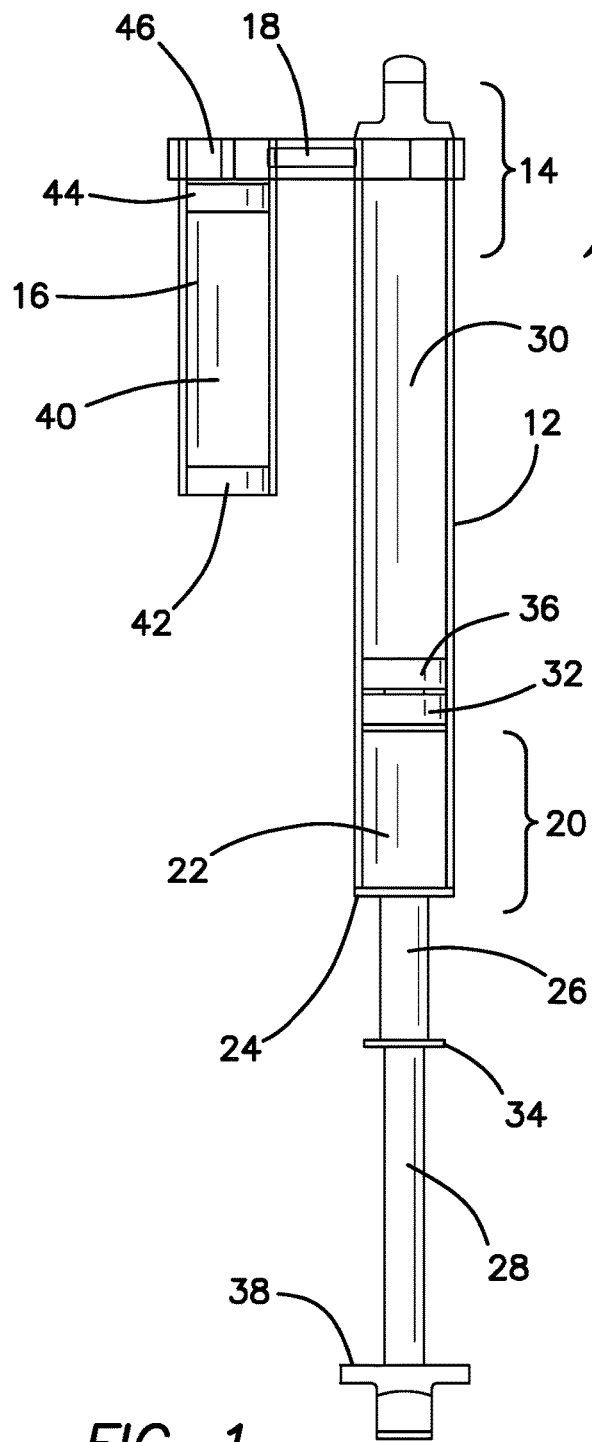
FIG. 1 is a side cross sectional view of the current invention comprising a main cylinder and its associated reservoir in a non-actuated state.

The current invention is a shock absorber comprising a multi-stage, nested piston and shaft design which is denoted generally by reference numeral 10 in FIG. 1. The shock absorber 10 comprises a can or cylinder 12 which is substantially cylindrical in shape and which contains an interior volume 30 defined by the surface of the cylinder 12 itself. At the top or proximal end 14 of the cylinder 12 is a reservoir 16 which is fluidly communicated to the internal volume of the cylinder 12 through a fluid conduit 18. The fluid conduit 18 is seen in FIG. 1 as a short pipe or pathway between the cylinder 12 and the reservoir 16, however it is to be expressly understood that the fluid conduit 18 may be comprised of an alternative structure such as, but not limited to, a hose, a tube, or other means of moving fluid from one location to another. Additionally, the fluid conduit 18 may be of any length as determined by the user. For clarification purposes, the term "proximal" or "proximally" refers to a location which is disposed closer to a driver/pilot/user of a vehicle while the term "distal" or "distally" refers to a location which is disposed closer to the portion of the vehicle which makes contact with the ground, such as a wheel, rail, or the like.

Returning to the cylinder 12, the bottom or distal end 20 comprises a stop 22 which is a cylindrical plug or physical barrier disposed within the internal volume 30 of the cylinder 12. Disposed distally from the stop is a seal 24. Both the stop 22 and the seal 24 comprise an aperture or bore defined through their respective longitudinal portions. The bores within both the stop 22 and the seal 24 are sufficiently sized and shaped to accommodate a first and a second shaft 26, 28 there through as is further detailed below. The first shaft 26 comprises a first piston 32 disposed at its top or proximal end and a first ring 34 disposed about its bottom or distal end. The first shaft 26, first piston 32, and the first ring 34 are hollow or have a circular aperture defined throughout its longitudinal length. In turn, the second shaft 28 likewise comprises a second piston 36 disposed at its top or proximal end and a second ring 38 disposed about its bottom or distal end.

Figure 6:
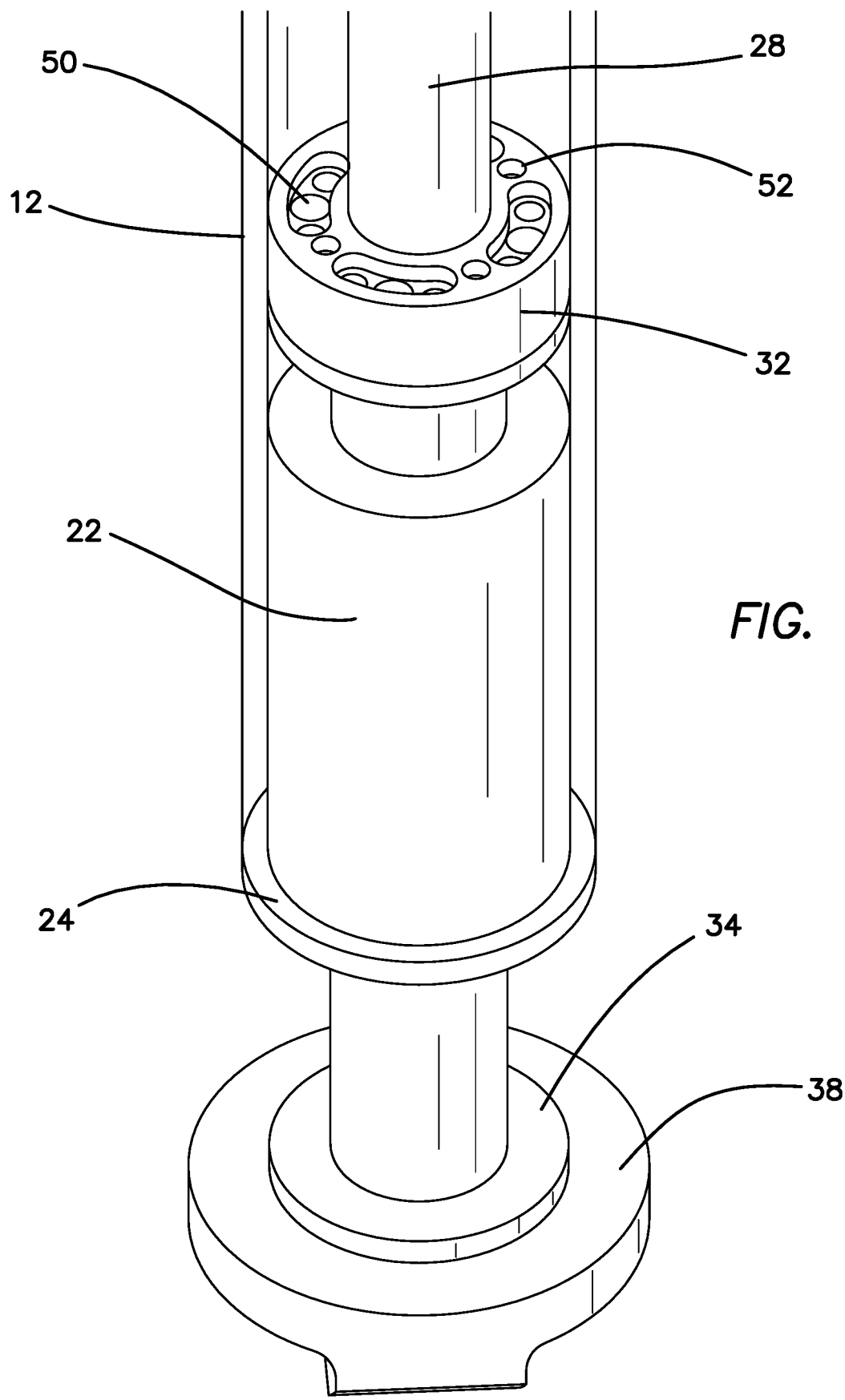
FIG. 6 is a magnified partially transparent view of the nested configuration of the first and second shafts disposed within the cylinder and the valving disposed therein.

Both the first piston 32 and the second piston 36 each comprise a plurality of first apertures or holes 50 and a plurality of second apertures or holes 52 defined through their respective surfaces as best seen in FIG. 6. The plurality of first holes 50 are substantially different than the plurality of second holes 52, specifically in one particular embodiment the plurality of first holes 50 comprise a larger diameter relative to the plurality of second holes 52 which comprise an overall smaller diameter. Each piston 32, 36 further comprises a plurality of valving washers 64 in a stacked configuration (see FIG. 8) as is known in the art which further provide dampening properties as each piston 32, 36 moves through the hydraulic fluid. It is to be expressly understood that each piston 32, 36 may comprise a different orientation or number of holes 50, 52 and/or valving washers 64 other than what is explicitly seen in FIGS. 6 and 8 without departing from the original spirit and scope of the invention. Specifically, the plurality of first holes 50 and second holes 52 may comprise an alternative shape or number so as to provide different desired fluid dynamics for the movement of each respective piston 32, 36. Additionally, each piston 32, 36 may comprise different numbers of valving washers 64 or various different thicknesses for each of the valving washers 64 so as to provide different characteristics for each of the pistons 32, 36. The nearly infinite different combinations of different sized holes 50, 52 and valving washers 64 allows a user to adjust and customize each of the pistons 32, 36 to fit a specific need or desired degree of performance. For example, in one specific embodiment, the second piston 36 may comprise a combination of holes 50, 52 and valving washers 64 so as to provide a "softer" piston, i.e. a piston which may more easily move through the hydraulic fluid, as compared to the first piston 32 which may be "stiffer" or slower to move through the hydraulic fluid.

As seen in FIG. 1, the first shaft 26 is sufficiently sized and shaped to accommodate the second shaft 28 therein. Specifically, the second shaft 28 is threaded or disposed through the first shaft 26 so that the second piston 36 resides or rests above the first piston 32. Additionally, because the second shaft 28 comprises a length which is significantly longer than the first shaft 26, the second ring 38 extends beyond the location of the first ring 34. The second shaft 28 is sufficiently sized so as to freely move in both the proximal and distal directions through the first shaft 26. The first shaft 26 in turn is likewise configured to move through the stop 22 and the seal 24 of the cylinder 12 in both the proximal and distal directions. In other words, the first shaft 26 and second shaft 28 form a nested or telescoping configuration with the first and second shafts 26, 28 free to move relative to each other and relative to the cylinder 12 itself. The internal volume 30 of the cylinder 12 is further filled with a hydraulic fluid appropriate for dampening the mechanical movement of the pistons 32, 36.

Figure 5:
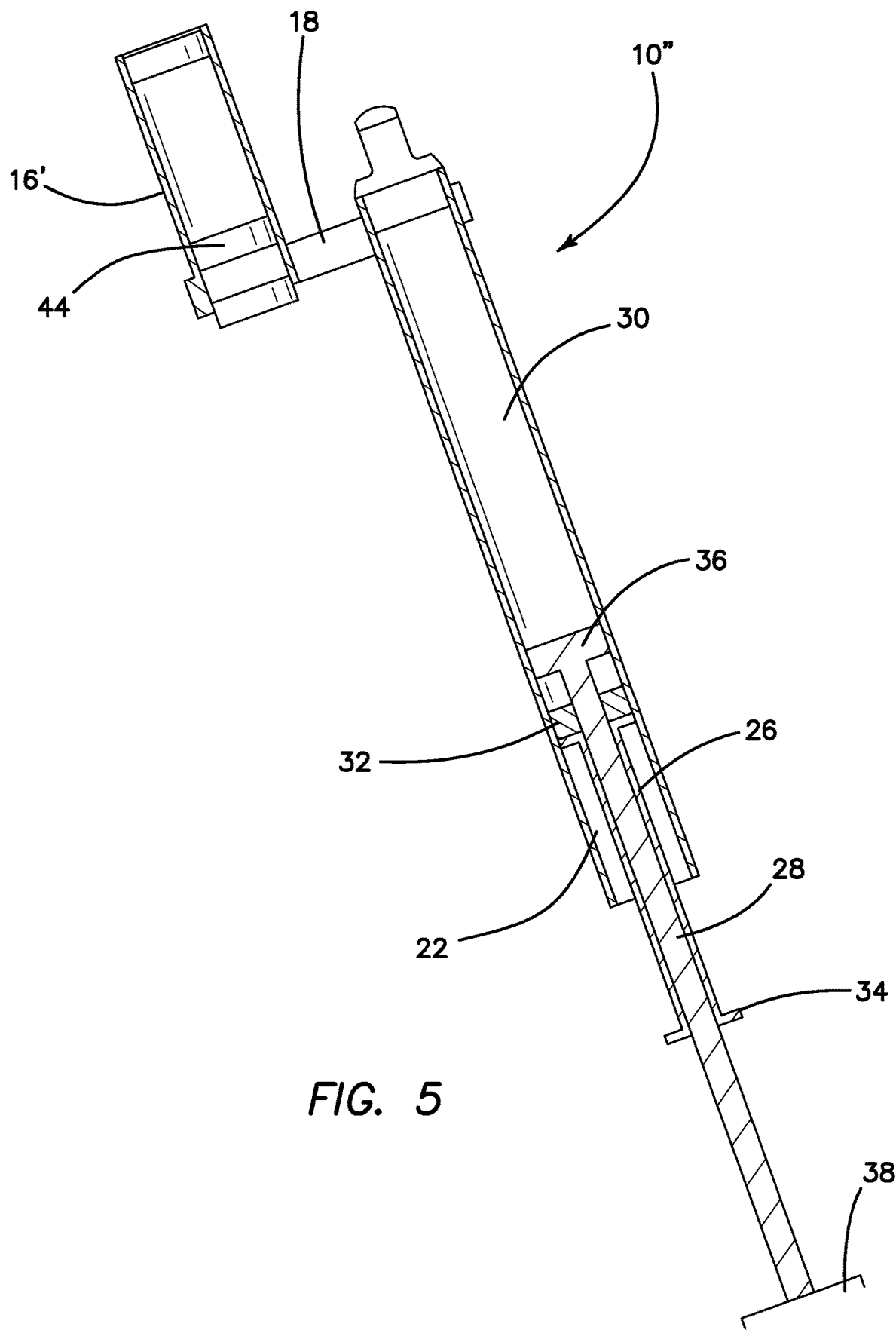
FIG. 5 is a cross sectional view of yet another alternative embodiment of the current invention wherein the reservoir is in a rotated or inverted position relative to the cylinder.

FIG. 5 shows further detail with regard to the interactions between the first shaft 26, the second shaft 28, and the stop 22 of the cylinder 12. The first shaft 26 is disposed within a cylindrical bore defined within the stop 22 with the first piston 32 and the first ring 34 disposed at either end of the shaft 26 to prevent the shaft 26 from either falling out of the cylinder 12 or from traversing too far into the cylinder 12, respectively. The second shaft 28 in turn is nested or disposed throughout the length of a cylindrical bore or aperture defined within the first shaft 26. The second piston 36 and second ring 38 keep the second shaft 28 within the first shaft 26, which thereby keeps the second shaft 28 disposed within the cylinder 12, no matter the amount of displacement experienced by the suspension system.

Turning now to the reservoir 16 seen in FIGS. 1-4, the reservoir 16 comprises an internal volume 40 with a reservoir seal 42 permanently disposed at its distal end. Disposed within the internal volume 40 is a reservoir piston 44 which configured to traverse the length of the reservoir 16 as fluid enters the reservoir 16. A reservoir valve 46 is further disposed between the fluid conduit 18 and the internal volume 40 of the reservoir 16 so as to effectively control the amount and speed of hydraulic fluid entering or exiting the reservoir 16. The reservoir valve 46 may be any valve suitable for governing the speed and volume of hydraulic fluid now known or later devised including but not limited to a variable or two-speed valve as is known in the art.

Figures 7, 8:
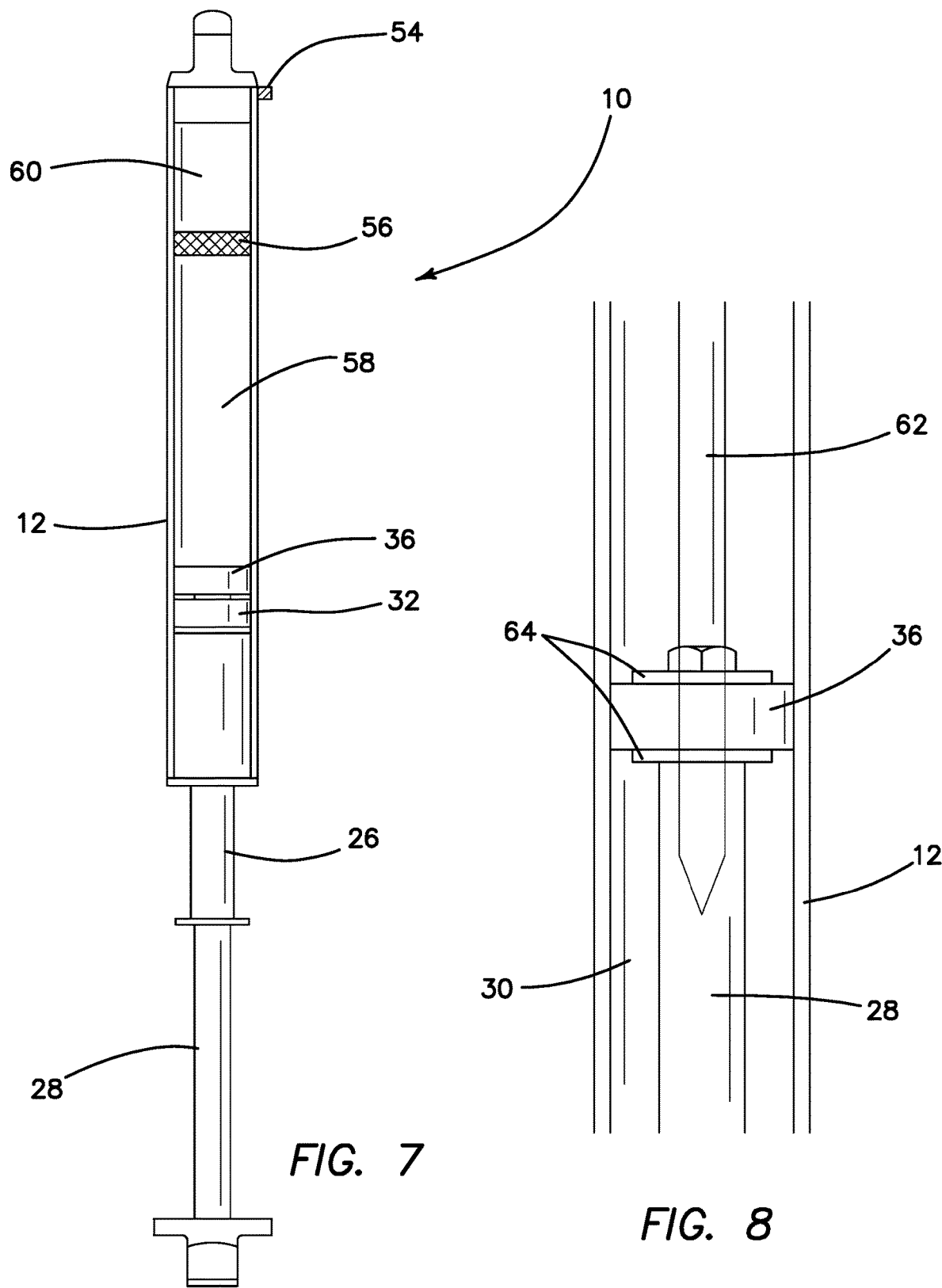
FIG. 7 is a side cross sectional view of an alternative embodiment of the current invention wherein a reservoir is incorporated into the internal volume of the cylinder.
FIG. 8 is a magnified side cross sectional view of an alternative embodiment of the current invention comprising a needle and a corresponding bore defined through the second piston and second shaft.

In an alternative embodiment seen in FIG. 7, the reservoir may be incorporated into the internal volume 30 of the cylinder 12. In this embodiment the internal volume 30 comprises a floating piston 56 which separates a volume of hydraulic fluid 58 from a volume of air 60 within a single cylinder 12. The floating piston 56 is configured to freely traverse in both the distal and proximal directions through the internal volume 30 as the pistons 32, 36 move through the cylinder 12 as detailed below. This embodiment further comprises a Schrader valve 54 disposed substantially near the top portion of the cylinder 12 to release excessive air pressure from the volume of air 60.

In yet another embodiment, the shock absorber 10 does not comprise a reservoir 16 at all and instead comprises a volume of air mixed in with hydraulic fluid disposed within the internal volume 30 of the cylinder 12. In this embodiment, the hydraulic fluid and air are allowed to mix as the pistons 32, 36 move through the internal volume of the cylinder 12.

Figure 2:
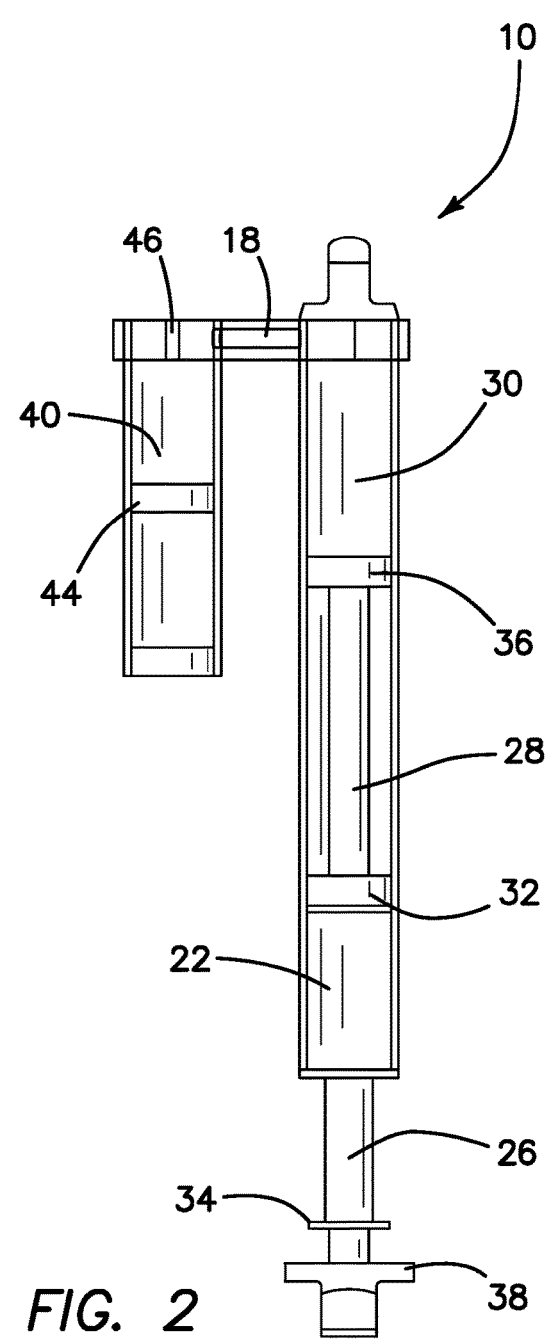
FIG. 2 is a side cross sectional view of the cylinder seen in FIG. 1 after a second piston has undergone a vertical displacement.
Figures 3, 4:
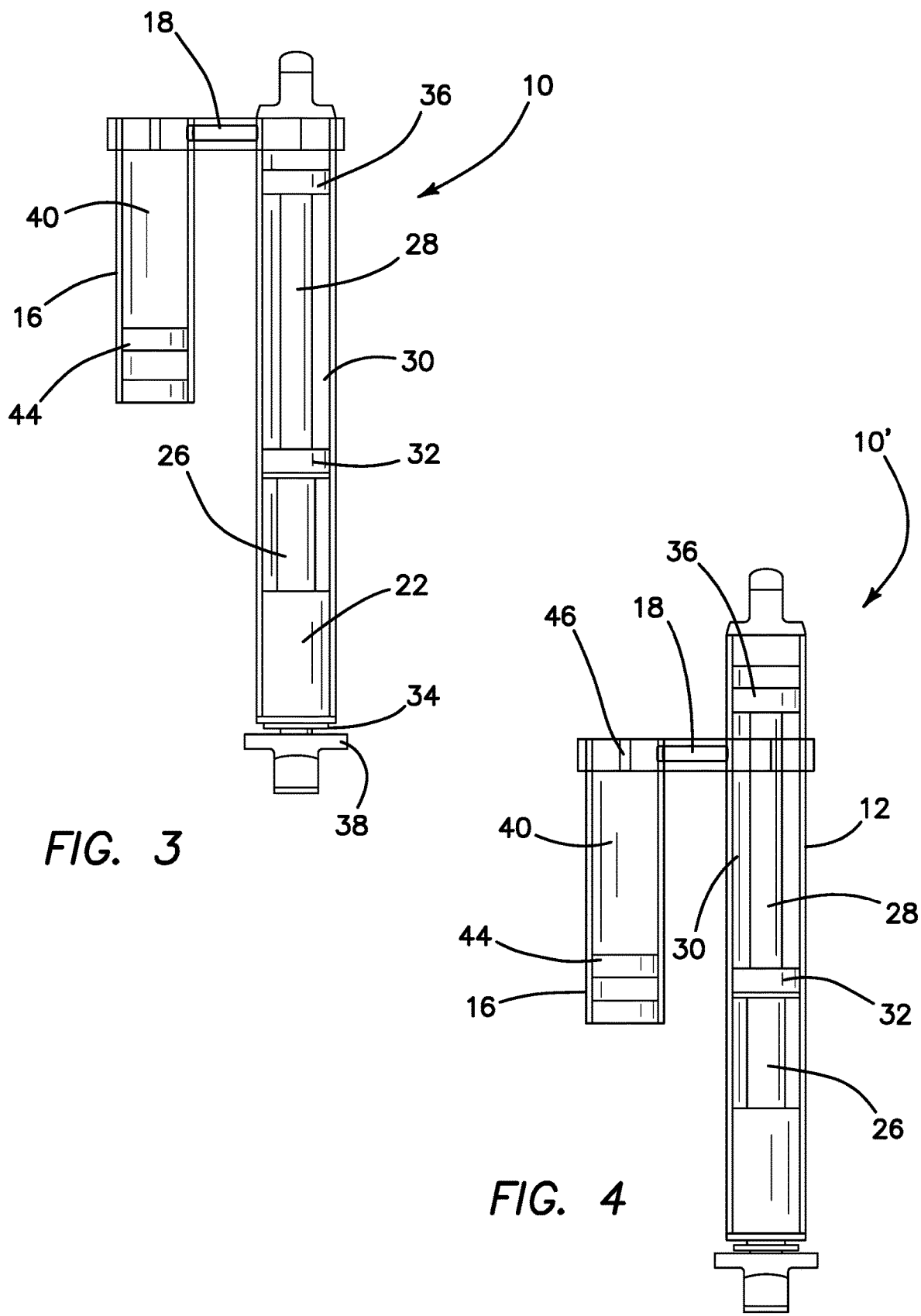
FIG. 3 is a side cross sectional view of the cylinder seen in FIG. 1 after both a first piston and the second piston have undergone a vertical displacement.
FIG. 4 is a magnified cross sectional view of an alternative embodiment of the current invention wherein the reservoir is fluidly communicated to the cylinder at a position that is distally located beneath a maximum position in which the second piston extends.

Use of the current shock absorber 10 may be had by turning to FIGS. 1-3. In FIG. 1, the shock absorber 10 is seen in its most non-actuated state, namely with the first piston 32 of the first shaft 26 resting against the stop 22 disposed within the cylinder 12 and with the second piston 36 of the second shaft 28 in turn resting against the first piston 32. The distal end of the second shaft 28 is coupled to the suspension system of a vehicle as is known in the art at a maximum distance relative to the cylinder 12. The hydraulic fluid contained within the internal volume 30 of the cylinder 12 remains in a largely settled state while the reservoir piston 44 is disposed at or near the top or proximal end of the reservoir 16. The reservoir piston 44 remains in place due to a pressurized volume of air disposed between the reservoir piston 44 and the reservoir seal 42.

When the suspension system of the vehicle undergoes a vertical displacement, for example when the vehicle traverses an incline or makes a sudden impact with the road or another object, the suspension system pushes the second shaft 28 in the proximal direction and up into the cylinder 12. Specifically, the proximal movement of the second shaft 28 moves the second piston 36 upwards through the internal volume 30 of the cylinder as seen in FIG. 2. Because the first piston 32 and the first shaft 26 have a cylindrical bore defined through their respective lengths, the first shaft 26 remains stationary as the second shaft 28 moves proximally through the cylinder 12. As the second piston 36 moves through the cylinder 12, the hydraulic fluid within the internal volume 30 begins to flow through the passing second piston 36, thereby slowing the proximal movement of the second piston 36. As the hydraulic fluid moves, the pressure increases within the internal volume 30 of the cylinder 12. If the internal pressure within the internal volume 30 increases past a predetermined threshold, the reservoir valve 46 opens to allow the hydraulic fluid which has been pushed into the fluid conduit 18 into the internal volume 40 of the reservoir 16. The incoming hydraulic fluid presses against the reservoir piston 44 until the internal air pressure within the reservoir 16 is overcome, thereby pushing the reservoir piston 44 in the distal direction as seen in FIG. 2.

The second piston 36 and the reservoir piston 44 continue to move in the proximal and the distal directions, respectively, until the displacement of the suspension system is slowed by the friction of the piston 36 moving through the hydraulic fluid. Specifically, as the hydraulic fluid is forced through the first holes 50, a frictional counterforce slows and then stops the movement of the second shaft 28, thereby softening or cushioning the displacement of the vehicle's suspension system. Simultaneously, the upward movement of the second shaft 28 compresses an external spring (not shown) which further slows the movement of the second shaft 28. As the vehicle adjusts to the change in its displacement, the suspension system relaxes which decreases the upward force placed on the second shaft 28. When the upward force is lower than the force exerted by the compressed external spring, the external spring expands and pushes the second piston 36 and the second shaft 28 back in the distal direction through the internal volume 30 of the cylinder. As the external spring expands, the air pressure within the reservoir 16 pushes the reservoir piston 44 back up in the proximal direction which in turn pushes the hydraulic fluid back through the fluid conduit 18 and into the internal volume 30 of the cylinder 12. Hydraulic fluid passes through the second plurality of holes 52 as the second piston 36 moves back through the internal volume 30 of the cylinder 12. If the suspension system of the vehicle does not experience any further displacement, the shock absorber 10 returns to its original state as seen in FIG. 1.

However if the displacement of the vehicle's suspension system is large enough or if the suspension system undergoes multiple rapid displacements, greater dampening of the suspension system is needed in order to prevent the suspension system from "bottoming out," namely wherein the second piston 36 makes contact with the top or proximal end 14 of the cylinder 12. In this instance, the second shaft 28 moves through the cylinder 12 in the same manner discussed above until the second ring 38 of the second shaft 28 makes contact with or is adjacently disposed next to the first ring 34 of the first shaft 26 as best seen in FIG. 2. As the displacement continues however, the second shaft 28 continues to move in the proximal direction up the cylinder 12 until it pushes up against the distal end of the first shaft 26, thereby moving the first shaft 26 in the same proximal direction. The first shaft 26 then moves the first piston 32 up through the hydraulic fluid within the internal volume 30 of the cylinder 12, thereby creating further friction with the hydraulic fluid as it passes through the first plurality of holes 50 defined in the first piston 32, thereby providing an additional dampening force against the incoming displacement.

The first and second pistons 32, 36 continue to move proximally through the cylinder 12, either at the same relative rate or, alternatively, at variable or different rates of speed according to the specific characteristics of the first and second pistons 32, 36 as is known in the art. As the pistons 32, 36 move through the cylinder 12, an additional amount or volume of the hydraulic fluid is pushed through the fluid conduit 18 and into the reservoir 16. As the pressure increases within the internal volume 40 of the reservoir 16, the reservoir piston 44 is pushed further and further distally downward through the reservoir 16, further compressing the volume of air disposed beneath the reservoir piston 44. Simultaneously, the external spring is further compressed as the first piston 32 and second piston 36 move through the internal volume 30. Movement of the pistons 32, 36, 44 continues until the displacement force is either matched by the spring force provided by the external spring or until a maximum displacement is reached as seen in FIG. 3. Specifically, FIG. 3 shows both the first and second shafts 26, 28 fully inserted into the internal volume 30 of the cylinder 12 with their respective first ring 34 and second ring 38 pressed flush against the bottom surface of the stop 22.

In one particular embodiment seen in FIG. 8, the shock absorber 10 further comprises a downward orientated needle 62 coupled to the top surface of the cylinder 12. In this embodiment, the second piston 36, the valving washers 64, and the second shaft 28 each comprise a bore or aperture defined through their respective centers to accommodate the insertion of the needle 62. As the second piston 36 approaches the top of the cylinder 12, the needle 62 is orientated so as to be inserted into the centrally defined bore or hollow core defined through the second piston 36. The needle 62 moves into the second shaft 28 with the continued upward movement of the piston/shaft 36, 28 and pushes any hydraulic fluid present within the defined central bore out through an aperture or other release point defined in the surface of the second shaft 28. The presence of the needle 62 further facilitates the flow of the hydraulic fluid from one side of the second piston 36 to the other and further dampens the movement of the vehicle's suspension system.

Returning to FIGS. 1-3, as the displacement force dissipates, the first and second pistons 32, 36 move back distally through the cylinder 12 to their respective starting positions, either in unison or at variable rates of speed relative to each other according to the fluid dynamics or characteristics of the pistons 32, 36 as is known in the art. In turn, the external spring expands which allows the volume of air within the reservoir 16 to also expand and push the reservoir piston 44 back in the proximal direction which forces the hydraulic fluid back into the cylinder 12 via the reservoir valve 46 and fluid conduit 18. As the pistons 32, 36 move back down through the length of the cylinder 12 the hydraulic fluid passes through their respective second holes 52, thereby providing a degree dampening force as the vehicle's suspension system returns to its original position. The process of the creating friction within the hydraulic fluid with one or both pistons 32, 26 and absorbing of the displacement of the vehicle's suspension system may be repeated ad infinitum or for as long as otherwise needed.

An alternative embodiment of the shock absorber 10' is seen in FIG. 4. Here, the reservoir 16 is fluidly communicated to the cylinder 12 at a position that is distally located beneath the maximum position in which the second piston 36 moves within the cylinder 12. Specifically, the fluid conduit 18 is fluidly coupled or communicated to the internal volume 30 of the cylinder 12 at a position that is located distally further down the length of the cylinder 12 than the apex or maximum position reached by the second piston 36 in its most actuated state. When in use, the second shaft 28 moves the second piston 36 through the internal volume 30 of the cylinder 12 up to and then past the aperture or opening of the fluid conduit 18, thus altering or changing the fluid dynamics related to the hydraulic fluid entering and exiting the reservoir as discussed above with regard to the previous embodiment.

In yet another embodiment seen in FIG. 5, the reservoir 16' of the shock absorber 10" is orientated to be substantially directed in an upward direction as opposed to the substantially downward direction seen in FIGS. 1-4. The rotated or inverted reservoir 16' operates in the same exact manner as the reservoir 16 discussed above in the previous embodiments, however the inverted reservoir 16' allows the user to install or fit the shock absorber 10" onto vehicles which may not be equipped or otherwise configured to accommodate a shock absorber with a downward orientated reservoir.

In an alternative embodiment, the shock absorber 10 may comprise a third piston shaft to provide further dampening effects and capabilities to the shock absorber. The third piston shaft may be nested within the second shaft 28 or alternatively, nested between the first piston shaft 26 and the second piston shaft 28. In this embodiment, the three different piston shafts may work in unison or in sequential order in a similar manner as discussed above with regard to the previous embodiment to provide the shock absorber an additional layer or level of absorption of the displacement of the suspension system. Additionally, in a related embodiment, a plurality of piston shafts more than what is explicitly disposed here may further be incorporated into the shock absorber in a telescopic configuration.

Many alterations and modifications may be made by those having ordinary skill in the art without departing from the spirit and scope of the embodiments. Therefore, it must be understood that the illustrated embodiment has been set forth only for the purposes of example and that it should not be taken as limiting the embodiments as defined by the following embodiments and its various embodiments.

Therefore, it must be understood that the illustrated embodiment has been set forth only for the purposes of example and that it should not be taken as limiting the embodiments as defined by the following claims. For example, notwithstanding the fact that the elements of a claim are set forth below in a certain combination, it must be expressly understood that the embodiments includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the embodiments is explicitly contemplated as within the scope of the embodiments.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the embodiments.

I claim:

1. An apparatus for dampening the movement of a vehicle comprising:
    a cylinder;
    a first shaft disposed within the cylinder, the first shaft comprising a distal end extending beyond the cylinder; and
    a second shaft nested within the first shaft, the second shaft comprising a distal end extending beyond the distal end of the first shaft,
    where the distal end of the second shaft is configured to make contact with the distal end of the first shaft outside of the cylinder,
    where the first shaft is configured to remain stationary within the cylinder until the distal end of the second shaft has made contact with the distal end of the first shaft,
    where the first shaft and second shaft are configured to move together through a length of the cylinder after the distal end of the second shaft has made contact with the distal end of the first shaft,
    where the first shaft comprises a first piston disposed on a proximal end of the first shaft,
    where the second shaft comprises a second piston disposed on a proximal end of the second shaft,
    where the first piston comprises an aperture to accommodate the second shaft, and
    where the first piston and the second piston each comprise a plurality of apertures defined through their respective surfaces.

2. The apparatus of claim 1 where the first shaft comprises a bore defined through its longitudinal length and where the second shaft is nested within the bore defined in the first shaft.

3. The apparatus of claim 1 further comprising:
    a volume of air;
    an internal volume of fluid within the cylinder; and
    a piston disposed between the volume of air and the internal volume of fluid within the cylinder.

4. The apparatus of claim 3 where the volume of air and the piston disposed between the volume of air and the internal volume of fluid within the cylinder are disposed within a reservoir coupled to the cylinder.

5. The apparatus of claim 1 further comprising a stop disposed within the cylinder, where the stop comprises a bore configured to accommodate movement of the first shaft and the second shaft there through.

6. A method for dampening a displacement force comprising:
    disposing a first shaft within a cylinder filled with a fluid, where a distal end of the first shaft extends beyond the cylinder;
    disposing a second shaft within the first shaft, where a distal end of the second shaft extends beyond the distal end of the first shaft;

moving the second shaft through the fluid relative to both the first shaft and to the cylinder in response to the displacement force;

contacting the first shaft with the second shaft outside of the cylinder;

maintaining the first shaft in a stationary position within the cylinder until contact is made with the second shaft; and moving the first shaft together with the second shaft through the fluid relative to the cylinder in response to the displacement force after the second shaft has made contact with the first shaft, where moving the first shaft together with the second shaft through the fluid relative to the cylinder in response to the displacement force after the second shaft has made contact with the first shaft comprises moving a second piston coupled to the second shaft and moving a first piston coupled to the first shaft through the fluid within the cylinder, and where moving the second piston coupled to the second shaft and moving the first piston coupled to the first shaft through the fluid within the cylinder further comprises channeling the fluid through a plurality of holes defined within the first piston and the second piston, respectively.

7. The method of claim 6 where moving the second shaft through the fluid relative to the first shaft comprises moving the second shaft through a bore defined through the length of the first shaft.

8. The method of claim 6 further comprising compressing a volume of air with a piston in contact with the fluid in response to the movement of the first shaft or the second shaft through the fluid.

9. The method of claim 8 where compressing the volume of air with a piston comprises compressing the volume of air within a reservoir fluidicly communicated to the cylinder.

10. The method of claim 9 further comprising transferring a portion of the fluid from the cylinder to the reservoir with the first shaft and the second shaft.

11. The method of claim 10 where compressing the volume of air within the reservoir comprises pressing the piston against the volume of air by the portion of fluid transferred from the cylinder.

\* \* \* \* \*